United States Patent
Bhattacharjee et al.

(10) Patent No.: US 10,325,299 B2
(45) Date of Patent: Jun. 18, 2019

(54) ENABLING DISTRIBUTION OF DIGITAL PICTURES

(71) Applicant: MasterCard International Incorporated, Purchase, NY (US)

(72) Inventors: Manash Bhattacharjee, Jersey City, NJ (US); Debashis Ghosh, Charlotte, NC (US); Randy Shuken, Westport, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 548 days.

(21) Appl. No.: 14/702,403

(22) Filed: May 1, 2015

(65) Prior Publication Data

US 2016/0321717 A1 Nov. 3, 2016

(51) Int. Cl.
*G06Q 20/12* (2012.01)
*G06Q 30/06* (2012.01)
*G06Q 30/00* (2012.01)
*G06Q 99/00* (2006.01)

(52) U.S. Cl.
CPC ....... *G06Q 30/0601* (2013.01); *G06Q 20/123* (2013.01); *G06Q 30/00* (2013.01); *G06Q 99/00* (2013.01)

(58) Field of Classification Search
CPC .......................... G06Q 30/0601; G06Q 30/123
USPC ........................................................ 705/26.1
See application file for complete search history.

(56) References Cited

U.S. PATENT DOCUMENTS

| | | | |
|---|---|---|---|
| 5,638,443 | A | 6/1997 | Stefik et al. |
| 5,664,111 | A | 9/1997 | Nahan et al. |
| 5,999,915 | A | 12/1999 | Nahan et al. |
| 6,343,273 | B1 | 1/2002 | Nahan et al. |
| 6,950,198 | B1 | 9/2005 | Berarducci et al. |
| 7,469,230 | B2 | 12/2008 | Vaidyanathan et al. |
| 7,525,680 | B2 | 4/2009 | Berarducci et al. |
| 7,593,869 | B2 | 9/2009 | Nahan et al. |
| 7,653,552 | B2 * | 1/2010 | Vaidyanathan ........ G06Q 30/06 380/231 |
| 8,001,052 | B2 | 8/2011 | Dunkeld et al. |
| 8,200,581 | B2 | 6/2012 | Dunkeld et al. |
| 8,583,556 | B2 | 11/2013 | Dunkeld et al. |
| 8,589,516 | B2 | 11/2013 | Wheeler et al. |

(Continued)

FOREIGN PATENT DOCUMENTS

| | | | |
|---|---|---|---|
| JP | 2002175380 | A | 6/2002 |
| JP | 2003030476 | A | 1/2003 |
| JP | 2003303292 | A | 10/2003 |

OTHER PUBLICATIONS

Getty Images, "Introduction to working with Getty Images", Jan. 15, 2014, Getty Images Contributor Community, Entire Document. (Year: 2014).*

(Continued)

*Primary Examiner* — Michael Misiaszek
*Assistant Examiner* — Jason B Warren
(74) *Attorney, Agent, or Firm* — Armstrong Teasdale LLP

(57) ABSTRACT

A mobile computing device configured for enabling distribution of digital pictures is provided. Additionally, a method for enabling distribution of digital pictures and a computer-readable storage medium having computer-executable instructions embodied thereon for enabling distribution of digital pictures are provided.

13 Claims, 13 Drawing Sheets

(56) References Cited

U.S. PATENT DOCUMENTS

| | | |
|---|---|---|
| 8,606,856 B2 | 12/2013 | Dunkeld et al. |
| 8,626,838 B2 | 1/2014 | Dunkeld et al. |
| 8,706,636 B2 | 4/2014 | Dunkeld et al. |
| 8,990,338 B2 | 3/2015 | Mitra et al. |
| 2002/0069117 A1 | 6/2002 | Carothers et al. |
| 2002/0123937 A1 | 9/2002 | Pickover et al. |
| 2002/0128935 A1 | 9/2002 | White et al. |
| 2002/0138576 A1 | 9/2002 | Schleicher et al. |
| 2002/0147661 A1 | 10/2002 | Hatakama et al. |
| 2002/0178087 A1 | 11/2002 | Henderson et al. |
| 2003/0069811 A1 | 4/2003 | Ximenes et al. |
| 2003/0120557 A1 | 6/2003 | Evans et al. |
| 2003/0144958 A1 | 7/2003 | Liang et al. |
| 2004/0148231 A1 | 7/2004 | Ximenes et al. |
| 2005/0289011 A1 | 12/2005 | Sporny |
| 2006/0069574 A1 | 3/2006 | Ok |
| 2007/0192205 A1 | 8/2007 | Nahan et al. |
| 2008/0129758 A1* | 6/2008 | Fox .................... H04N 1/32128 345/661 |
| 2010/0235256 A1* | 9/2010 | Kang .................... G06Q 10/10 705/26.1 |
| 2011/0060793 A1 | 3/2011 | Wheeler et al. |
| 2011/0179378 A1 | 7/2011 | Wheeler et al. |
| 2011/0302064 A1 | 12/2011 | Dunkeld et al. |
| 2011/0302303 A1 | 12/2011 | Dunkeld et al. |
| 2011/0302636 A1 | 12/2011 | Dunkeld et al. |
| 2011/0302661 A1 | 12/2011 | Dunkeld et al. |
| 2014/0129353 A1 | 5/2014 | Spevak |
| 2014/0137270 A1 | 5/2014 | Dunkeld et al. |
| 2015/0063562 A1* | 3/2015 | Nilsen .................. H04L 9/3247 380/28 |
| 2015/0131872 A1* | 5/2015 | Ganong ............. G06K 9/00677 382/118 |
| 2016/0132869 A1* | 5/2016 | Stade ................. G06Q 20/4018 705/75 |

OTHER PUBLICATIONS

PCT Search Report and Written Opinion, application No. PCT/US2016/029573, dated Jul. 26, 2016, 6 pp.

* cited by examiner

ENABLING DISTRIBUTION OF DIGITAL PICTURES

BACKGROUND

This disclosure relates to processing electronic signals transmitted through computer networks, and more specifically to distributing digital picture data through a computer network to a plurality of server computing devices and processing electronic purchase signals associated therewith.

At least some known websites ("picture marketplace websites") enable users to sell or license ("commercialize") pictures that the users generate. For example, a user may generate pictures using a camera built into their smart phone. Known picture marketplace websites generally require the user to generate an account with the website, upload the user-generated pictures to the website, enter prices for each of the pictures, and enter information about a bank account associated with the user. Multiple users then browse a directory of the user-generated pictures on the website and purchase rights (e.g., a license) to use one or more of the pictures. When a purchaser purchases rights to one or more of the pictures, the purchaser initiates a financial transaction to transfer an amount of money equal to the price from a bank account of the purchaser to the bank account of the user. For these known picture marketplace websites, a user must individually upload the same pictures to each website in order for the pictures to be available for viewing on each respective website. Additionally, the user must set the pricing information and maintain up-to-date bank account information on each of the respective websites. Uploading each new picture that the user wishes to commercialize to each picture marketplace website over time is cumbersome and labor-intensive.

BRIEF DESCRIPTION OF THE DISCLOSURE

In one aspect, a mobile computing device configured for enabling distribution of digital pictures is provided. The mobile computing device includes a processor in communication with a memory. The processor is configured to retrieve, from the memory, a plurality of pictures generated by a user of the mobile computing device. Additionally, the mobile computing device is configured to retrieve, from the memory, account data used by a payment network for transferring money to a financial account associated with the user, receive, from the user, a selection of one or more of the retrieved pictures to be commercialized, receive a designation of a price that the user is willing to commercialize the selected pictures for, and generate and store a configuration file in the memory that includes login credentials for a plurality of picture marketplace websites, a tokenized version of the account data, a location where the pictures are stored in the memory, and the price. Additionally, the mobile computing device is configured to generate metadata including the tokenized version of the account data and the price in association with each of the selected pictures and transmit the selected pictures and the associated metadata to a plurality of picture marketplace websites for commercialization thereon.

In another aspect, a method for enabling distribution of digital pictures is provided. The method is implemented by a mobile computing device including a processor in communication with a memory. The method includes retrieving, from the memory, a plurality of pictures generated by a user of the mobile computing device. The method additionally includes retrieving, from the memory, account data used by a payment network for transferring money to a financial account associated with the user, receiving, by the mobile computing device, from the user, a selection of one or more of the retrieved pictures to be commercialized, receiving, by the mobile computing device, a designation of a price that the user is willing to commercialize the selected pictures for, and generating and storing, by the mobile computing device, a configuration file in the memory that includes login credentials for a plurality of picture marketplace websites, a tokenized version of the account data, a location where the pictures are stored in the memory, and the price. Additionally, the method includes generating, by the mobile computing device, metadata including the tokenized version of the account data and the price in association with each of the selected pictures and transmitting, by the mobile computing device, the selected pictures and the associated metadata to a plurality of picture marketplace websites for commercialization thereon.

In yet another aspect, a computer-readable storage medium having computer-executable instructions embodied thereon is provided. When executed by a mobile computing device including at least one processor coupled to a memory, the computer-executable instructions cause the mobile computing device to retrieve, from the memory, a plurality of pictures generated by a user of the mobile computing device. Additionally, the instructions cause the mobile computing device to retrieve, from the memory, account data used by a payment network for transferring money to a financial account associated with the user, receive, from the user, a selection of one or more of the retrieved pictures to be commercialized, receive a designation of a price that the user is willing to commercialize the selected pictures for, and generate and store a configuration file in the memory that includes login credentials for a plurality of picture marketplace websites, a tokenized version of the account data, a location where the pictures are stored in the memory, and the price. Additionally, the instructions cause the mobile computing device to generate metadata including the tokenized version of the account data and the price in association with each of the selected pictures and transmit the selected pictures and the associated metadata to a plurality of picture marketplace websites for commercialization thereon.

BRIEF DESCRIPTION OF THE DRAWINGS

FIG. 1 is a schematic diagram illustrating an example multi-party payment card industry system for enabling payment-by-card transactions in which merchants and card issuers do not necessarily have a one-to-one relationship.

FIG. 2 is a simplified block diagram of an example payment processing system including a payment processing server computing device and a plurality of computing devices in accordance with one example embodiment of the present disclosure.

FIG. 3 is an expanded block diagram of a server architecture of the payment processing system including the plurality of computing devices in accordance with one example embodiment of the present disclosure.

FIG. 4 illustrates a configuration of a client system shown in FIGS. 2 and 3 in accordance with one example embodiment of the present disclosure.

FIG. 5 illustrates a configuration of a server system shown in FIGS. 2 and 3 in accordance with one example embodiment of the present disclosure.

FIG. 6 is a diagram of a relationship between pictures stored on a mobile computing device and a plurality of picture marketplace websites in accordance with an example embodiment of the present disclosure.

FIG. 7 is a diagram of a submission transmitted from the mobile computing device of FIG. 6 to at least one picture marketplace website of FIG. 6, in accordance with an example embodiment of the present disclosure.

FIG. 8 is a diagram of a submission transmitted from the mobile computing device of FIG. 6 to at least one picture marketplace website of FIG. 6, in accordance with another example embodiment of the present disclosure.

FIG. 9 is a diagram of a configuration file generated by the mobile computing device in accordance with an example embodiment of the present disclosure.

FIG. 10 is a diagram of a process in which a purchaser purchases a picture using a first website of the plurality of picture marketplace websites, in accordance with an example embodiment of the present disclosure.

FIG. 11 is a diagram of a process in which a purchaser purchases a picture using a first website of the plurality of picture marketplace websites, in accordance with another example embodiment of the present disclosure.

FIG. 12 is a flowchart of an example process implemented by the mobile computing device for distributing digital pictures in one example embodiment of the present disclosure.

FIG. 13 is a diagram of components of one or more example computing devices that may be used in the system shown in FIG. 2.

DETAILED DESCRIPTION OF THE DISCLOSURE

Figure 1:
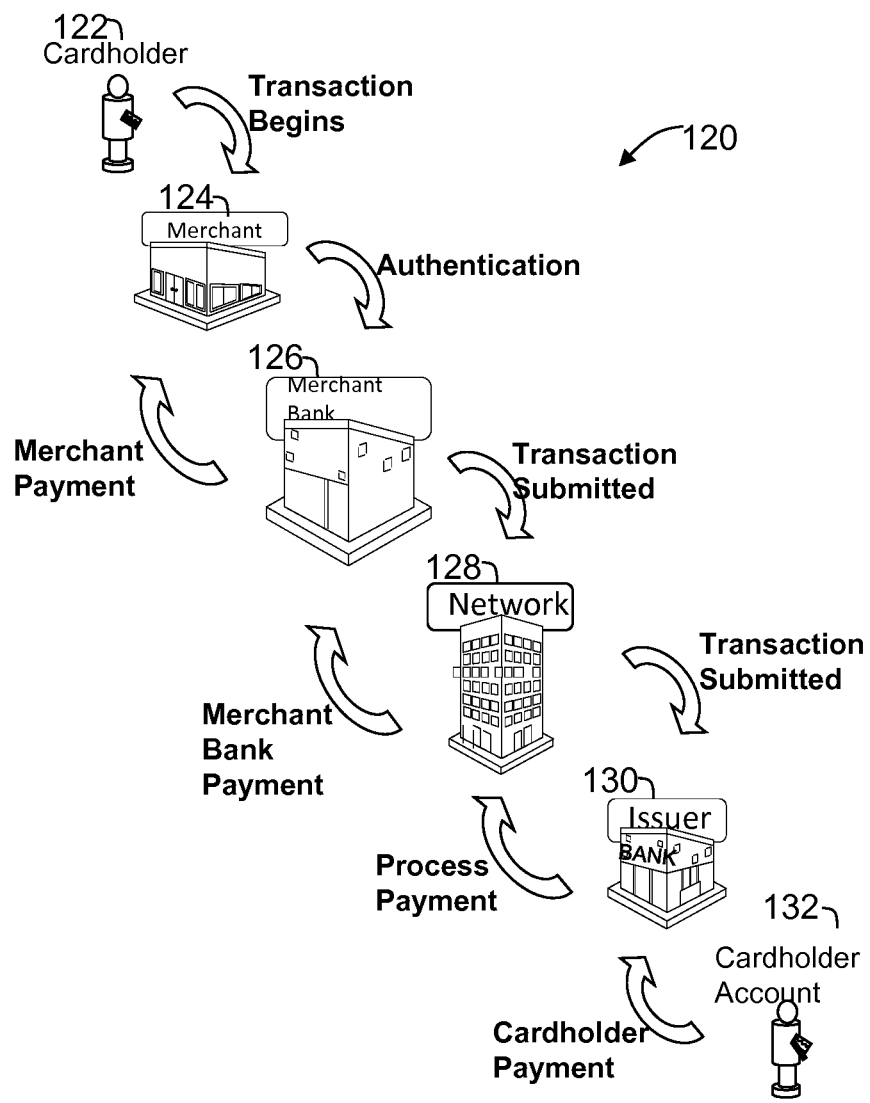
FIGS. 1-13 show example embodiments of the methods and systems described herein.

The system described herein includes an application programming interface ("API") or "plugin" that, when executed by a software application in a mobile computing device such as a smartphone, causes the mobile computing device to retrieve, from the memory of the mobile computing device, pictures generated by the user (e.g., pictures generated using the camera built into the mobile computing device). In some implementations, the user specifies a location where the pictures are stored in the memory. In other implementations, the mobile computing device searches the entire memory for user-generated pictures. The mobile computing device also retrieves, from the memory, financial account data used by a payment network for transferring money to a financial account associated with the user. Additionally, the mobile computing device performs a registration process including prompting the user to accept a commercialization agreement, for example a license agreement, pertaining to the pictures. Additionally, the mobile computing device prompts the user to enter login credentials for a plurality of picture marketplace websites. If the user does not already have accounts with the picture marketplace websites, the user registers accounts with the picture marketplace websites, then enters the login credentials to the mobile computing device.

The mobile computing device then receives, from the user, a selection of one or more of the retrieved pictures to be commercialized through the picture marketplace websites. The mobile computing device also receives a designation of a price that the user is willing to commercialize each picture for. The mobile computing device generates and stores a configuration file in memory that includes the login credentials, a location where the pictures are stored in the memory, a tokenized (e.g., encrypted) version of the account data, and the price. Additionally, the mobile computing device generates metadata including the tokenized (i.e., encrypted) version of the account data, the price, and license terms in association with each of the pictures selected for commercialization. Additionally, the mobile computing device transmits the selected pictures and the associated metadata to the plurality of picture marketplace websites for commercialization thereon.

In some implementations, the mobile computing device embeds the metadata into each picture. For example, the mobile computing device embeds the metadata into a header of a picture file, for example a header of a JPEG (Joint Photographic Experts Group) or PNG (Portable Network Graphics) file. In other implementations, the mobile computing device stores the metadata along with the picture in a package file. For example, the mobile computing device generates an XML (Extensible Markup Language) file that includes the metadata and that references the picture file. The mobile computing device stores the XML file and the picture file in a package file, such as a ZIP file.

Each picture marketplace website extracts the metadata and makes the pictures available for purchasers to purchase using the respective websites. If a purchaser selects one or more of the pictures to purchase, the respective picture marketplace website uses the tokenized account data to initiate a payment from the purchaser to the user, for example through the payment network.

In some implementations, the payment network receives, from one of the picture marketplace websites, a request to transmit money equal to the price to the account of the user. The request includes the tokenized version of the account data, extracted from one of the pictures. In response, the payment network transmits the money to the account of the user using the tokenized version of the account data. In other implementations, the payment network receives a request from one of the picture marketplace websites for the account data of the user. The request includes the tokenized version of the account data. In response, the payment network transmits the account data in a non-tokenized form to the picture marketplace website to enable the picture marketplace website to transfer money equal to the price to the account of the user.

In some implementations, the payment network transmits an executed version of a license agreement to the user when a purchaser purchases a license to one of the pictures through one of the picture marketplace websites. For example, the picture marketplace website transmits an executed license agreement, executed by the purchaser, to the interchange network in association with the request to transmit the payment to the account of the user. The interchange network then transmits the executed license agreement to the mobile computing device of the user.

In some implementations, when a purchaser purchases a picture using one of the picture marketplace websites, the picture marketplace website transmits, to the purchaser, a link to a website of the payment network (e.g., a MasterPass website) that enables the purchaser to transmit money to the account of the user using the tokenized version of the account data.

The methods and systems described herein may be implemented using computer programming or engineering techniques including computer software, firmware, hardware or any combination or subset thereof, wherein the technical effect is achieved by performing at least one of (a) retrieve, from the memory, a plurality of pictures generated by a user of the mobile computing device; (b) retrieve, from the memory, account data used by a payment network for transferring money to a financial account associated with the user; (c) receive, from the user, a selection of one or more of the retrieved pictures to be commercialized; (d) receive a designation of a price that the user is willing to commercialize the selected pictures for; (e) generate and store a configuration file in the memory that includes login credentials for a plurality of picture marketplace websites, a tokenized version of the account data, a location where the pictures are stored in the memory, and the price; (f) generate metadata including the tokenized version of the account data and the price in association with each of the selected pictures; and (g) transmit the selected pictures and the associated metadata to a plurality of picture marketplace websites for commercialization thereon. More specifically, a mobile computing device described herein is specially programmed with computer code to perform the above processes. The technical effects described herein apply to the technical field of transmitting digital picture data through computer networks. The systems and methods described herein provide the technical advantage of enabling automatic transmission of digital pictures to multiple picture marketplace websites without requiring a user to individually transmit each digital picture to each picture marketplace website. Additionally, the systems and methods described herein provide the technical advantage of encoding metadata including pricing data, license terms, and tokenized financial account data in or in association with each digital picture, and transmitting the metadata to each picture marketplace website, thereby enabling users of the picture marketplace websites to electronically transmit funds for the purchase of one or more of the digital pictures, in accordance with the pricing data and license terms.

In situations in which the systems discussed herein collect personal information about users, or may make use of personal information, the users may be provided with an opportunity to control whether programs or features collect user information. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as a city, a ZIP code, or state level), so that a particular location of a user cannot be determined. Thus, the user may have control over how information is collected about the user and used by the systems.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 120 for enabling payment-by-card transactions in which merchants and card issuers do not necessarily have a one-to-one relationship. The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment account card, such as a credit card account or a debit card account, to a cardholder 122, who uses the payment account card to tender payment for a purchase from a merchant 124. To accept payment with the payment account card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe on the payment account card or EMV chip and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor." In some instances, a merchant (e.g., merchant 124) stores payment card information associated with a cardholder (e.g., cardholder 122) and requests authorization from acquirer 126 using the stored payment card information, rather than reading the cardholder's account information from the payment card itself (i.e., a card-on-file (COF) transaction).

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is cleared and settled between merchant 124, acquirer 126, and issuer 130. Clearing refers to the communication of financial data for reconciliation purposes between the parties. Settlement refers to the transfer of funds between the merchant's account, acquirer 126, and issuer 130 related to the transaction.

Figure 2:
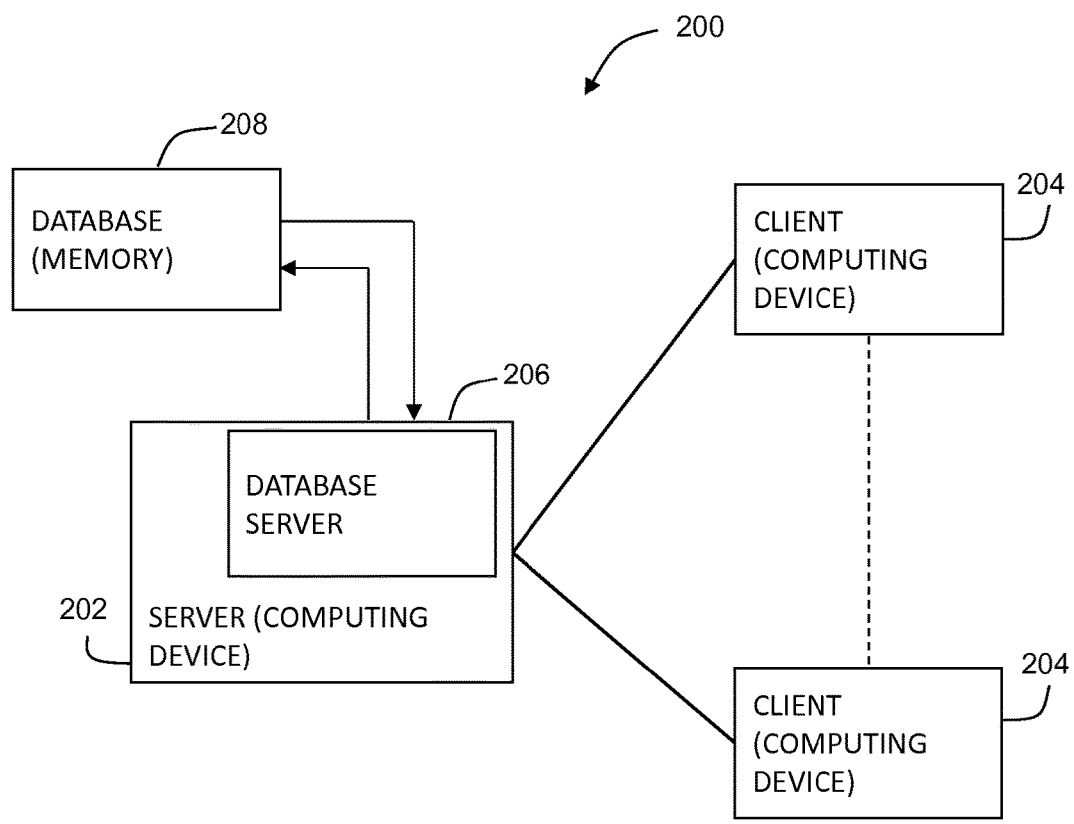

FIG. 2 is a simplified block diagram of an example payment processing system 200 in accordance with one embodiment of the present disclosure. In the example embodiment, system 200 includes a payment processing server computing device 202 and a plurality of client subsystems, also referred to as client systems 204 or client computing devices, connected to payment processing server computing device 202. In one embodiment, client systems 204 are computers including a web browser, such that payment processing server computing device 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a mobile computing device, such as a notebook computer, a web-based phone, a personal digital assistant (PDA), or other web-connectable equipment. In one embodiment, client computing device 204 includes a point-of-sale (POS) device, a cardholder computing device (e.g., a smartphone, a tablet, or other computing device), or any other computing device capable of communicating with payment processing server computing device 202. A database server 206 is connected to a database 208 containing information on a variety of matters, as described below in greater detail. In one embodiment database 208 is stored on payment processing server computing device 202 and may be accessed by potential users at one of client systems 204 by logging onto payment processing server computing device 202 through one of client systems 204. In any alternative embodiment, database 208 is stored remotely from payment processing server computing device 202 and may be non-centralized.

Figure 3:
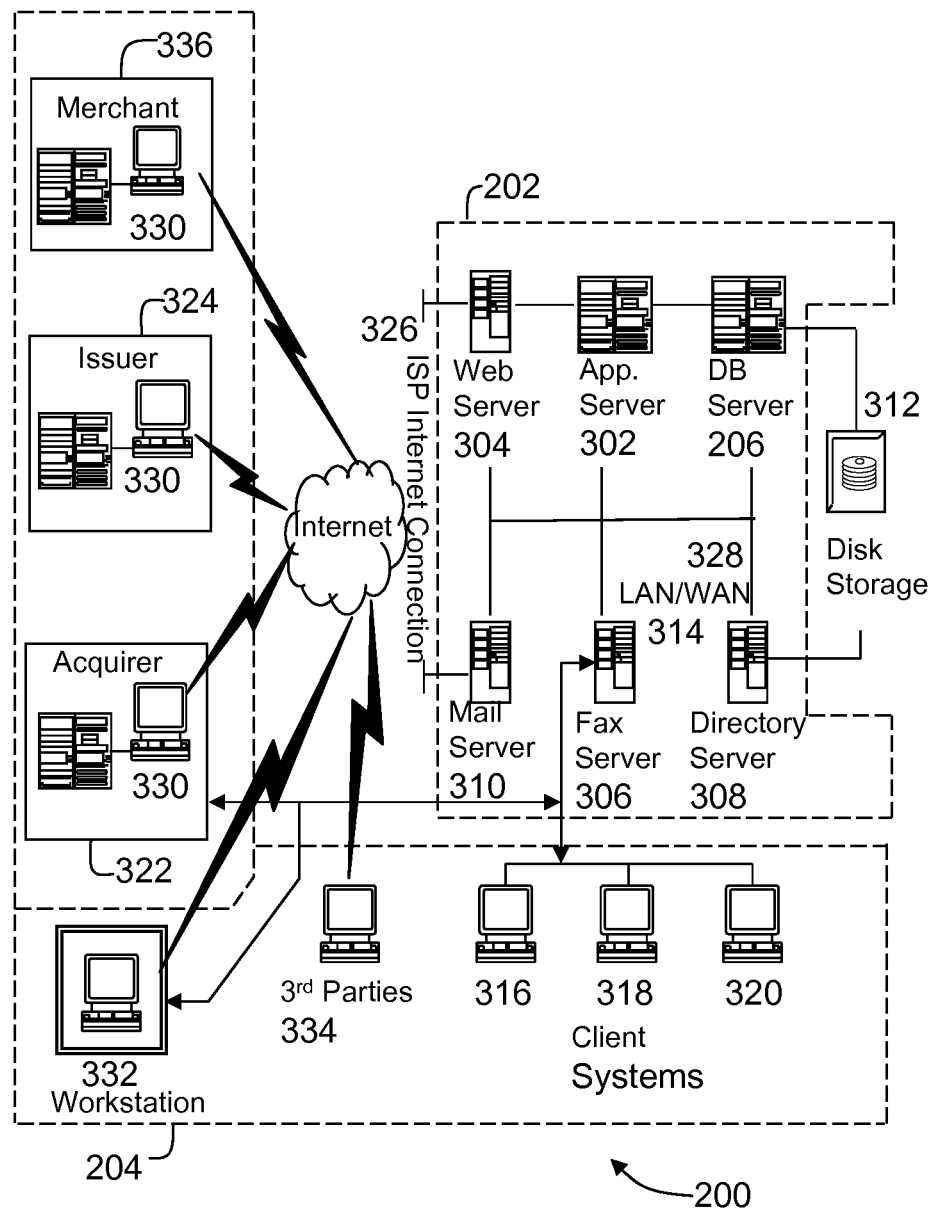

FIG. 3 is an expanded block diagram of an example embodiment of a server architecture of payment processing system 200 in accordance with one embodiment of the present disclosure. Payment processing system 200 includes payment processing server computing device 202 and client systems 204. Payment processing server computing device 202 includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Payment processing server computing device 202 is configured to be communicatively coupled to various entities, including acquirers 322 and issuers 324, and to third parties 334 (e.g., users of picture marketplace websites, as described in more detail herein) using an Internet connection 326. Server system 202 is also communicatively coupled with one or more merchants 336. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Furthermore, fax server 306 communicates with remotely located client systems, including a client system 332, using a telephone link. Fax server 306 is configured to communicate with other client systems 316, 318, and 320 as well.

Figure 4:
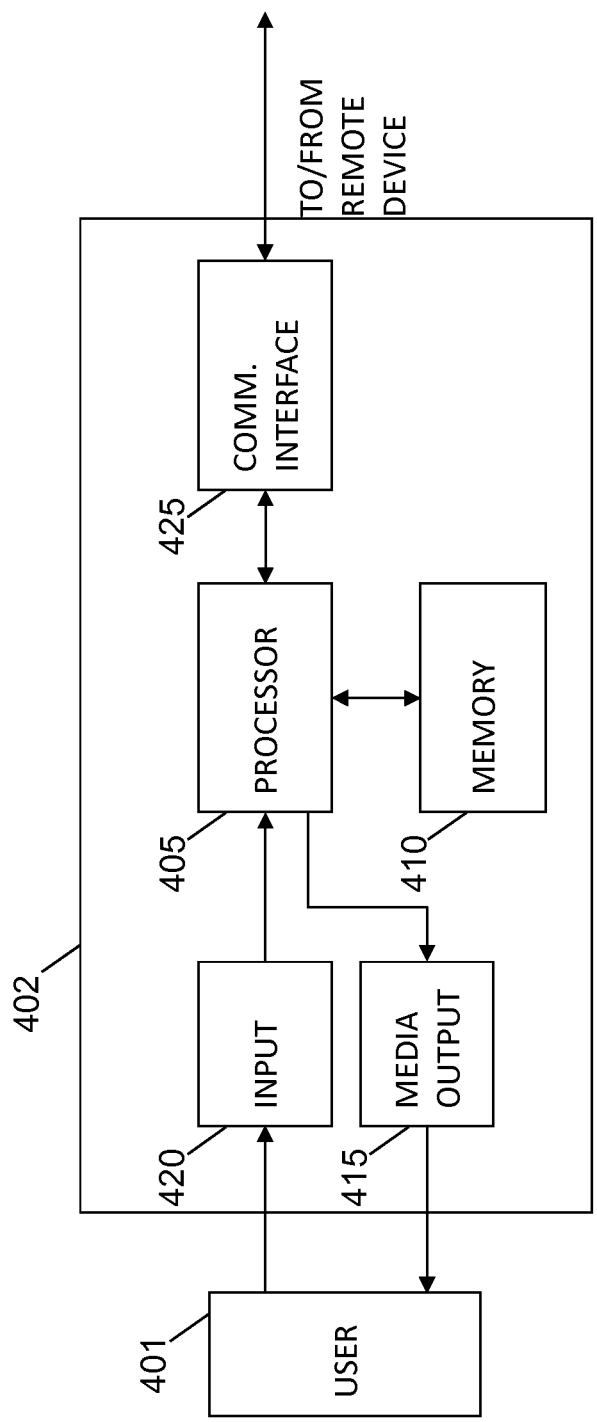

FIG. 4 illustrates an example configuration of a client computing device 402. Client computing device 402 may include, but is not limited to, client systems ("client computing devices") 204, 316, 318, and 320, workstation 330, manager workstation 332, and third party computing devices 334 (shown in FIG. 3).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 122). Media output component 415 is any component capable of conveying information to user 401. In some embodiments, media output component 415 includes an output adapter such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Client computing device 402 may also include a communication interface 425, which is communicatively coupleable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website from a web server associated with a merchant. A client application allows users 401 to interact with a server application associated with, for example, a merchant.

Figure 5:
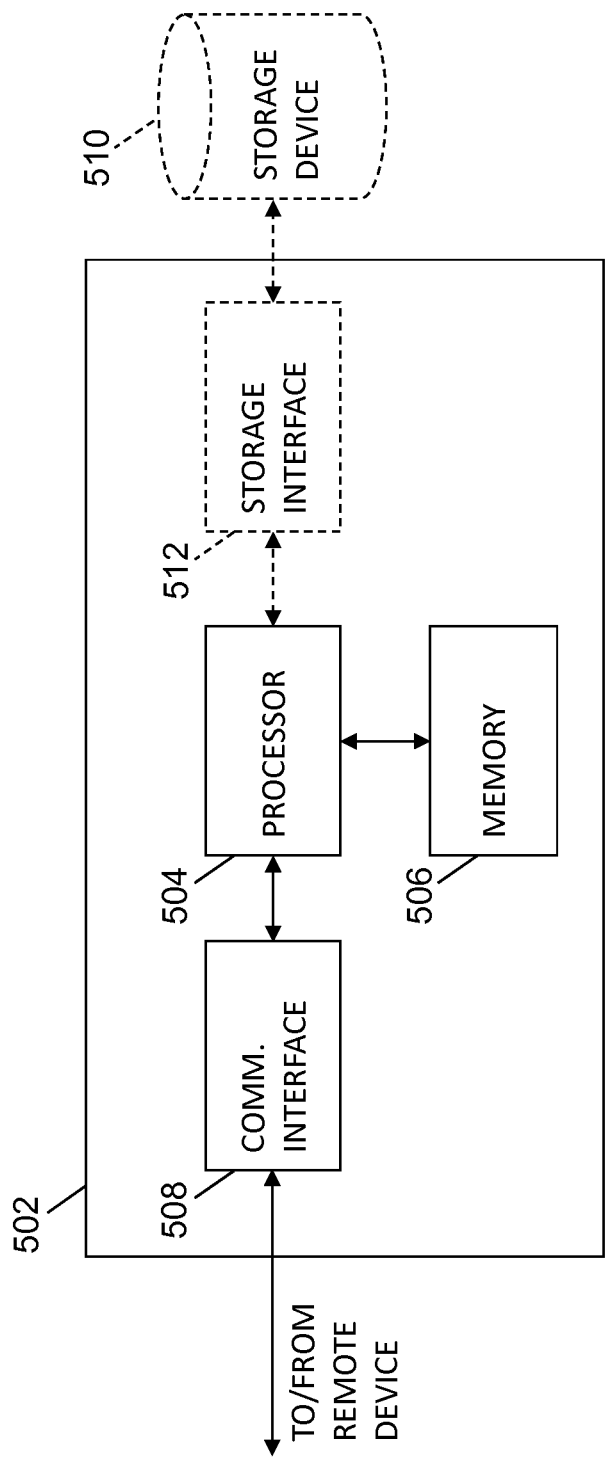

FIG. 5 illustrates an example configuration of a server computing device 502. Server computing device 502 is representative of payment processing server computing device 202 (shown in FIGS. 2 and 3), database server 206, application server 302, web server 304, fax server 306, directory server 308, mail server 310, and one or more picture marketplace websites 616 (shown in FIG. 6).

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
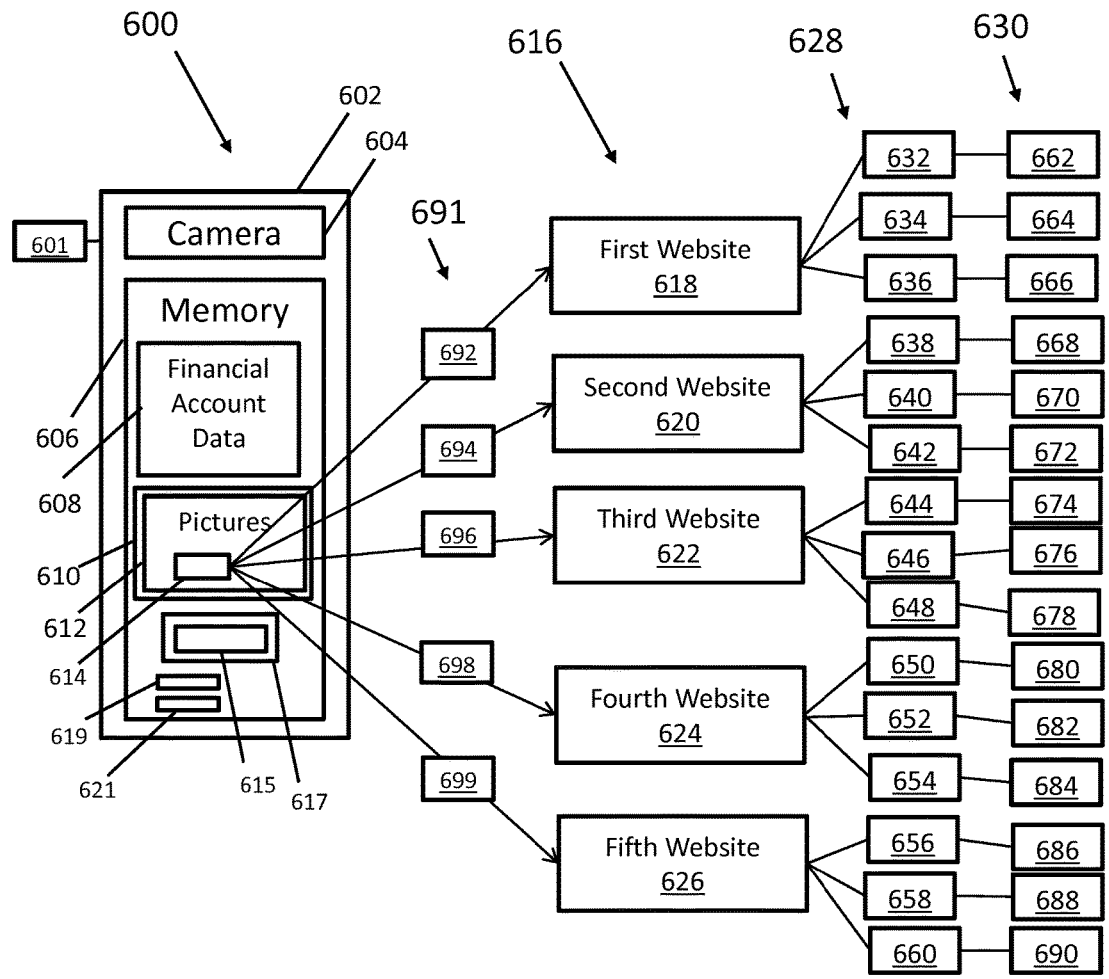

FIG. 6 is a diagram of a relationship 600 between pictures 612 stored in a mobile computing device 602 (e.g., a smartphone or tablet computing device) and a plurality of picture marketplace websites 616. More specifically, mobile computing device 602 stores pictures 612 in a memory device 606. A user 601 (e.g., cardholder 122) of mobile computing device 602 generates at least some of pictures 612 using a camera 604 included in mobile computing device 602. In some implementations, mobile computing device 602 stores pictures 612 in a predefined location 610 in memory device 606, such as a predefined directory. Additionally, mobile computing device 602 stores, in memory device 602, financial account data 608, such as a primary account number (PAN) associated with the user 601 (e.g., cardholder account 132) of mobile computing device 602.

Memory device 606 additionally stores an application programming interface (API) 615 that, when executed by a software application 617 executing on mobile computing device 602, causes mobile computing device 602 to perform a plurality of functions. In some implementations, mobile computing device 602 performs a registration process. More specifically, mobile computing device 602 prompts user 601 to accept terms of an agreement pertaining to the licensing or sale of pictures 612. Additionally, mobile computing device 602 prompts user 601 to select which of the plurality of picture marketplace websites 616 to transmit pictures 612 to. Additionally, mobile computing device 602 prompts user 601 to enter login credentials for each of the selected picture marketplace websites 616. Additionally, mobile computing device 602 prompts user 601 to enter a price for the pictures 612. Further, mobile computing device 602 prompts user 601 to enter a selection 614 of pictures 612 for transmission to the selected picture marketplace websites 616. Mobile computing device 602 stores a configuration file 619 in memory device 606 that includes data obtained from user 601 during the registration process. Additionally, mobile computing device 602 generates metadata 621 associated with the selected pictures 614 and transmits the selected pictures 614 along with the metadata 621 to the plurality of picture marketplace websites 616 in a plurality of submissions 691. In at least some implementations, mobile computing device 602 generates and stores metadata 621 as an extensible markup language (XML) file or other file that is human-readable. In other implementations, mobile computing device 602 generates and stores metadata 621 in a binary format that is not human-readable.

In at least some implementations, mobile computing device 602 transmits a first submission 692 to a first picture marketplace website 618, a second submission 694 to a second picture marketplace website 620, a third submission 696 to a third picture marketplace website 622, a fourth submission 698 to a fourth picture marketplace website 624, and a fifth submission 699 to a fifth picture marketplace website 626. Each submission 691 includes one or more selected pictures 614 and corresponding metadata 621. The content of the submissions 691 and the metadata 621 is described in more detail herein.

A plurality of users 628, each having an associated financial account 630, view pictures on first picture marketplace website 618, second picture marketplace website 620, third picture marketplace website 622, fourth picture marketplace website 624, and fifth picture marketplace website 626, respectively. More specifically, at least a first user 632 having a first financial account 662, a second user 634 having a second financial account 664, and a third user 636 having a third financial account 666 use first picture marketplace website 618. Additionally, a fourth user 638 having a fourth financial account 668, a fifth user 640 having a fifth financial account 670, and a sixth user 642 having a sixth financial account 672 use second picture marketplace website 620. Further, a seventh user 644 having a seventh financial account 674, an eighth user 646 having an eighth financial account 676, and a ninth user 648 having a ninth financial account 678 use third picture marketplace website 622. Additionally, a tenth user 650 having a tenth financial account 680, an eleventh user 652 having an eleventh financial account 682, and a twelfth user 654 having a twelfth financial account 684 use fourth picture marketplace website 624. Further, a thirteenth user 656 having a thirteenth financial account 686, a fourteenth user 658 having a fourteenth financial account 688, and a fifteenth user 660 having a fifteenth financial account 690 use fifth picture marketplace website 626.

Mobile computing device 602 includes a price, terms of a license agreement, and a tokenized (e.g., encrypted) form of financial account data 608 in each submission 691 as metadata 621 that enables each respective picture marketplace website 616 to extract the price, license agreement terms, and financial account data, as described in more detail herein. Users 628 then purchase licenses to pictures through picture marketplace websites 616 using their respective financial accounts 630. More specifically, each picture marketplace website 616 displays the price and terms of the license agreement associated with each picture and one or more users 628 purchase a license to one or more of the pictures by agreeing to the terms and transferring funds equal to the respective price to the financial account (e.g., cardholder account 132) of user 601, based on the tokenized financial account data, using processes described in more detail herein.

Figure 7:
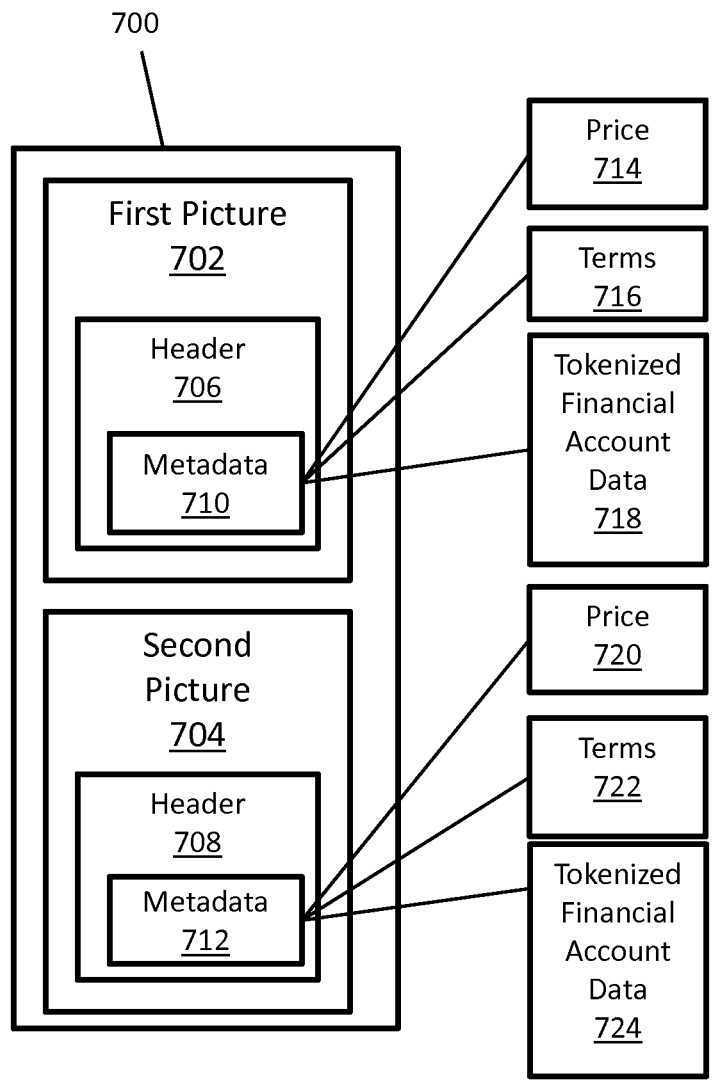

FIG. 7 is a diagram of an example submission 700 transmitted from mobile computing device 602. For example, in at least some implementations, submission 700 is representative of at least one of first submission 692, second submission 694, third submission 696, fourth submission 698, and fifth submission 699. Submission 700 includes a first picture 702 and a second picture 704. In other implementations, submission 700 includes a different number of pictures than two. First picture 702 includes a first header 706 and second picture 704 includes a second header 708. First header 706 includes first metadata 710 and second header 708 includes second metadata 712. First metadata 710 includes a price 714, license agreement terms 716, and tokenized financial account data 718 of user 601 (e.g., cardholder account 132). Similarly, second metadata 712 includes a price 720, license agreement terms 722, and tokenized financial account data 724. First metadata 710 and second metadata 712 are representative of metadata 621 (FIG. 6). In at least some implementations, first metadata 710 and second metadata 712 include the same data. For example, in some implementations, prices 714 and 720 are the same, terms 716 and 722 are the same, and tokenized financial account data 718 and 724 are the same.

Figure 8:
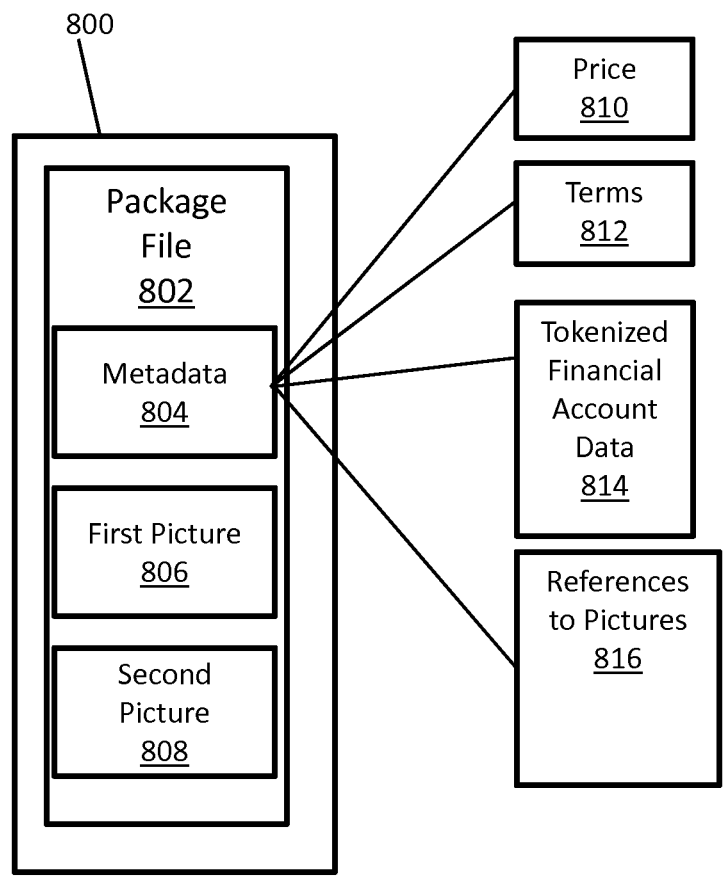

FIG. 8 is a diagram of a second embodiment of a submission 800 transmitted from mobile computing device 602 to at least one picture marketplace website 616, in accordance with the present disclosure. Submission 800 includes a package file 802, such as a ZIP file, a tape archive (TAR) file, or other file type that packages multiple files together. Package file 802 includes metadata 804, a first picture 806, and a second picture 808. Metadata 804 is representative of metadata 621 (FIG. 6) and is similar to metadata 710 and 712 (FIG. 7), in that metadata 804 includes a price 810, license agreement terms 812, and tokenized financial account data 814. In at least some implementations, metadata 804 includes references 816 to pictures that metadata 804 applies to (e.g., first picture 806 and second picture 808). For example, references 816 is a listing a filenames corresponding to first picture 806 and second picture 808. In some implementations, rather than specifying a single price (e.g., price 810) or a single set of license agreement terms 812, metadata 804 specifies a specific price and/or a specific set of license agreement terms for each picture (e.g., first picture 806 and second picture 808) and specifies which picture the price and/or license agreement terms apply to with references 816.

Figure 9:
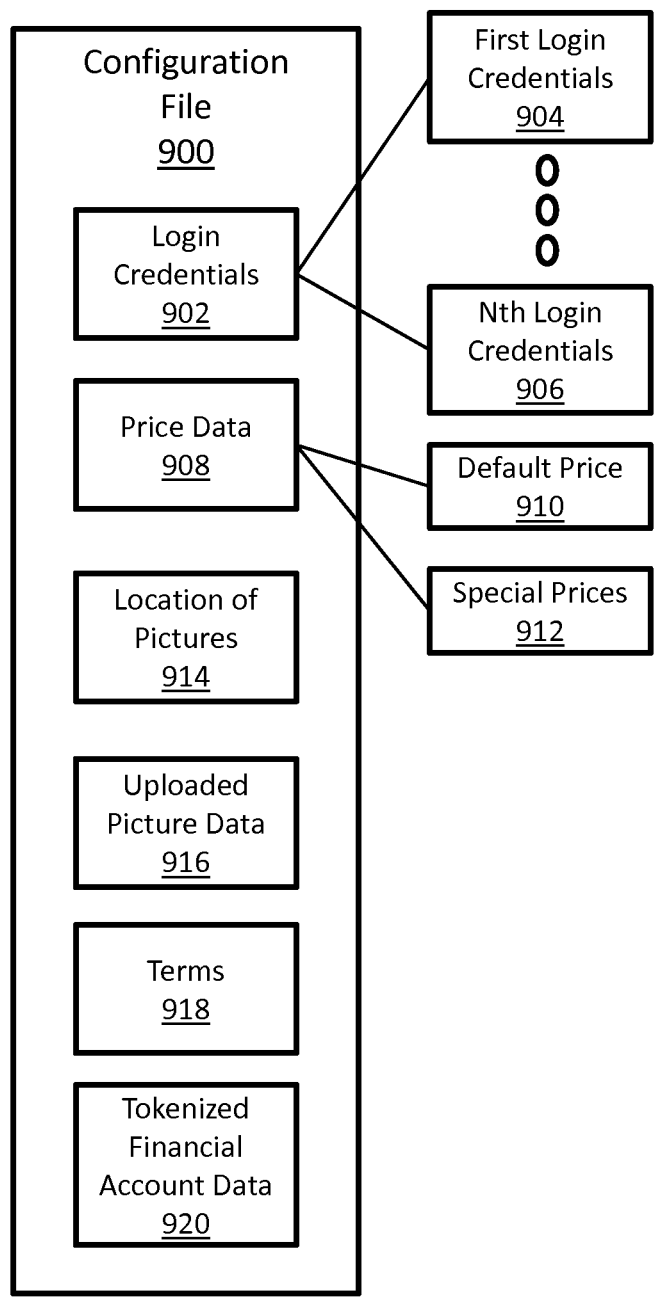

FIG. 9 is a diagram of a configuration file 900 generated by mobile computing device 602 in accordance with an example embodiment of the present disclosure. Mobile computing device 602 stores login credentials 902. More specifically, mobile computing device 602 stores first login credentials 904, for example for first picture marketplace website 618 through Nth login credentials 906, for example for fifth picture marketplace website 626. In at least some implementations, mobile computing device 602 receives login credentials 902 from user 601 during the registration process described above, with reference to FIG. 6. Additionally, mobile computing device 602 stores price data 908 in configuration file 900. More specifically, mobile computing device 602 stores at least a default price 910 for pictures selected by user 601 (e.g., selection 614) for commercialization through picture marketplace websites 616. Additionally, in at least some implementations, mobile computing device 602 stores one or more specific prices 912, different from the default price 910, for one or more pictures (e.g., first picture 702 and/or second picture 704). Additionally, mobile computing device 602 stores a location 914 of pictures (e.g., a path to directory 610) selected by user 601 for transmission to picture marketplace websites 616. For example, in at least some implementations, user 601 moves pictures designated by user 601 for uploading to picture marketplace websites 616 into directory 610, which is identified by configuration file 900. Additionally, mobile computing device 602 stores uploaded picture data 916 in configuration file 900.

In at least some implementations, uploaded picture data 916 includes a list of pictures that mobile computing device 602 has transmitted to picture marketplace websites in submissions (e.g., submissions 691). Additionally, mobile computing device 602 stores license agreement terms 918, for example license agreement terms for the pictures that user agreed to during the registration process, described above. In at least some implementations, on a periodic basis, mobile computing device 602 loads configuration file 900, compares pictures stored in directory 610 to uploaded picture data 916, and determines, from the comparison whether any new pictures exist in directory 610 that have not previously been uploaded to picture marketplace websites 616. For any pictures that have not previously been transmitted to picture marketplace websites 616, mobile computing device 602 generates submissions for the pictures, including generating corresponding metadata (e.g., metadata 710) based at least in part on the price data 908, financial account data 608, and terms 918. By generating the corresponding metadata and transmitting the pictures in directory 610 on a periodic basis to all picture marketplace websites 616 that configuration file 900 includes login credentials 902 for, user 601 is relieved of having to manually keep track of which pictures have been transmitted to which picture marketplace websites, manually setting the price for each picture, and transmitting the pictures to each picture marketplace website 616 each time the user 601 generates new pictures that user 601 would like to commercialize through picture marketplace websites 616. Additionally, mobile computing device 602 tokenizes (e.g., encrypts) financial account data 608 and stores the tokenized financial account data 920 in configuration file 900, for inclusion in the metadata of submissions 691.

Figure 10:
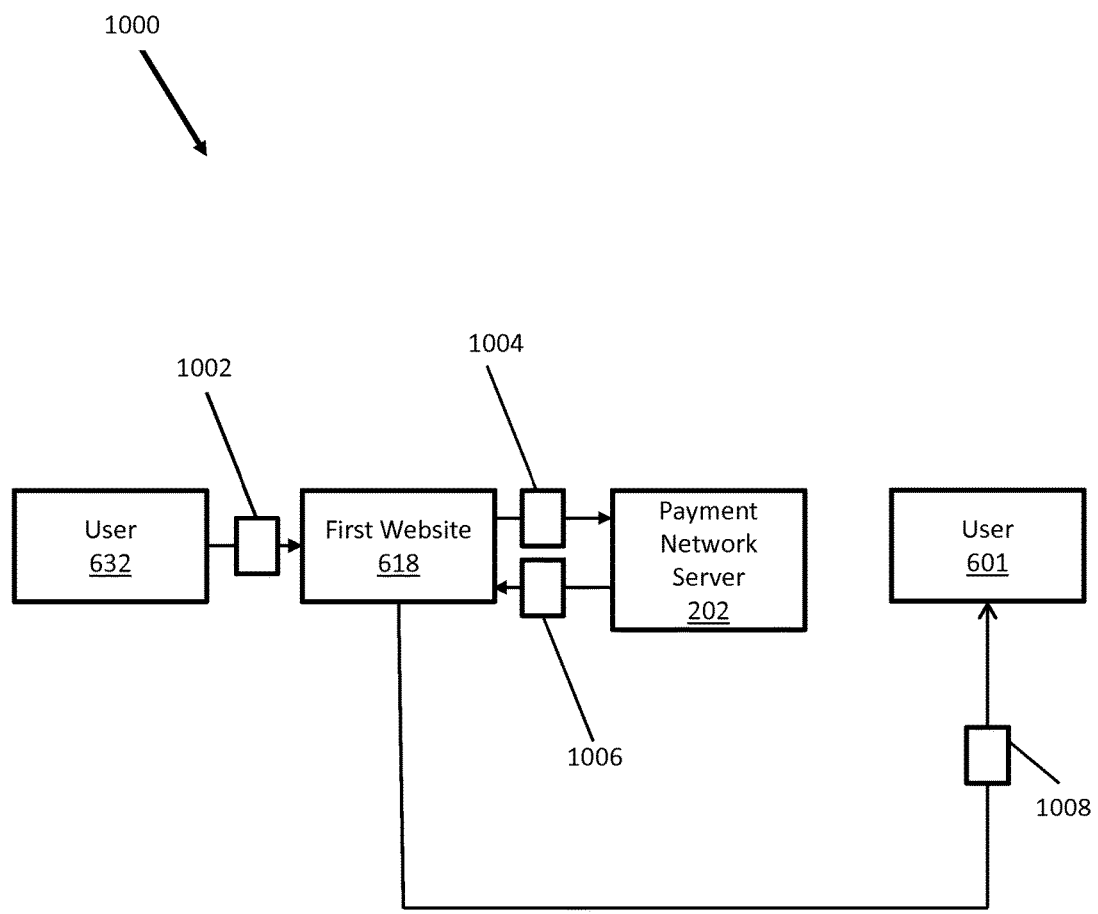

FIG. 10 is a diagram of a process 1000 in which first user 632 of first picture marketplace website 618 purchases a picture (e.g., first picture 702) through first picture marketplace website 618. More specifically, after receiving first submission 692, first picture marketplace website 618 extracts the metadata (e.g., first metadata 710) and displays first picture 702 on first marketplace website 618, in association with price 714 and license agreement terms 716. First user 632 views first picture 702 on first picture marketplace website 618, decides to purchase a license to first picture 702, and transmits a purchase signal 1002 to first picture marketplace website 618 indicating that first user 632 agrees to the license agreement terms 716 and the price 714. First picture marketplace website 618 receives purchase signal 1002 and transmits a request signal 1004, including the tokenized financial account data 718 included in first metadata 710 to payment network server 202. Payment network server 202 receives request signal 1004 and transmits a response signal 1006 to first picture marketplace website 618, including a non-tokenized version of the financial account data (e.g., financial account data 608). First picture marketplace website 618 then transmits a payment signal 1008, which transmits funds equal to price 714 from first financial account 662 of first user 632 to user 601, and more specifically to cardholder account 132 of user 601, as specified in financial account data 608 transmitted in response signal 1006. For example, in some implementations, payment signal 1008 initiates an automated clearinghouse (ACH) transaction from first financial account 662 to cardholder account 132. In other implementations, payment signal 1008 transfers funds to cardholder account 132 through a different payment means, for example as an authorization request message transmitted through payment network 128.

Figure 11:
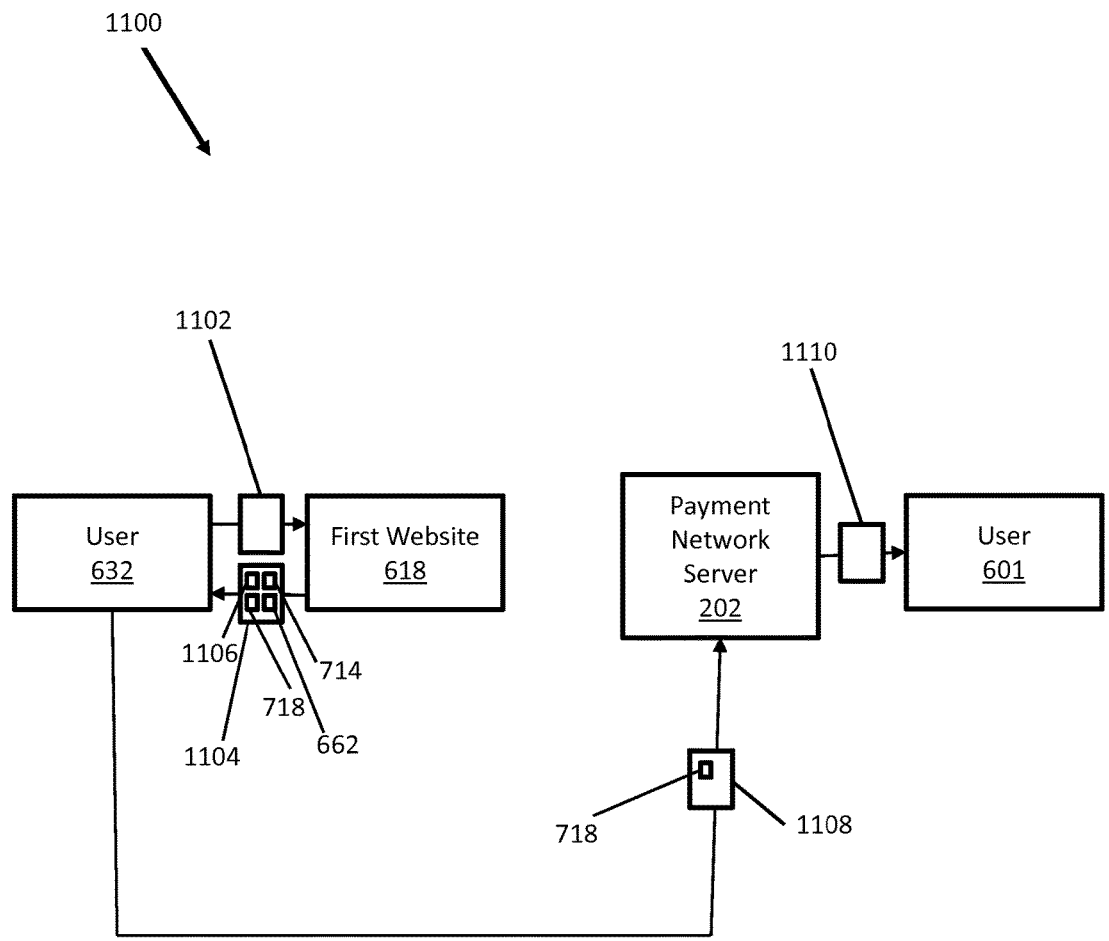

FIG. 11 is a diagram of an alternative process 1100 in which first user 632 purchases a picture (e.g., first picture 702) using first picture marketplace website 618. Process 1100 is similar to process 1000, except as described herein. First user 632 transmits a purchase signal 1102, similar to purchase signal 1002, to first picture marketplace website 618. First picture marketplace website 618 receives purchase signal 1102 and transmits a link signal 1104 to first user 632. Link signal 1104 includes a link 1106 (e.g., a hyperlink) to payment network server 202. Link signal 1104 additionally includes tokenized financial account data 718 of user 601, extracted from first metadata 710, price 714, and at least in some implementations, first financial account 662.

User 632 then transmits a payment signal 1108 to payment network server 202 including tokenized financial account data 718, price 714, and first financial account 662. More specifically, in at least some implementations, tokenized financial account data 718, price 714, and first financial account 662 are encoded into link 1106, such that when first user 632 activates (e.g., clicks on) link 1106, a web browser (not shown) operated by first user 632 transmits the tokenized financial account data 718, price 714, and first financial account 662 to payment network server 202 in payment signal 1108. In response, payment network server 202 processes a transfer 1110 of funds equal to the price 714 from first financial account 662 to cardholder account 132 of user 601. In other implementations, rather than transmitting link signal 1104 to first user 632, first picture marketplace website instead transmits payment signal 1108 directly to payment network server 202, in response to receiving purchase signal 1102 from first user 632.

Figure 12:
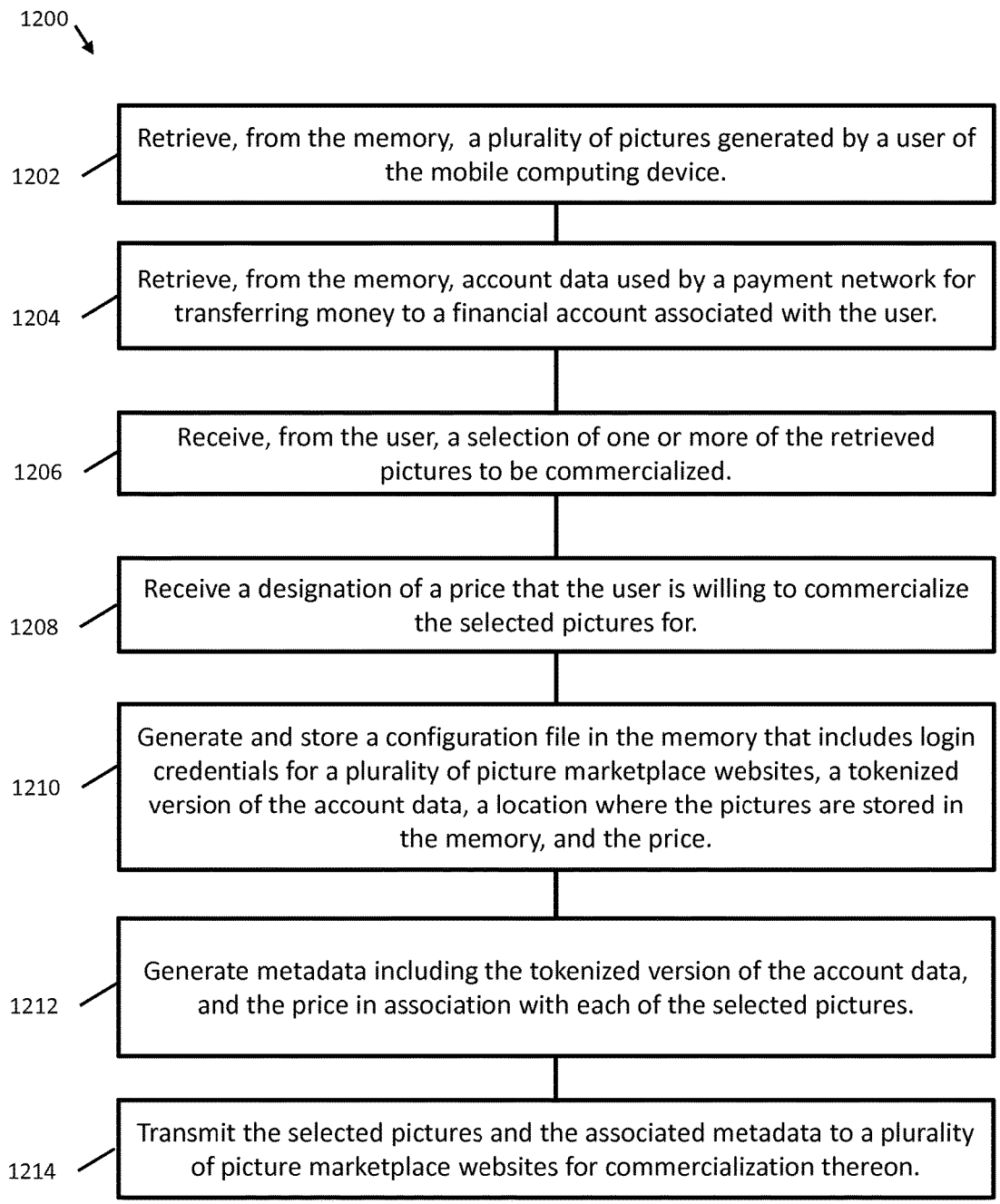

FIG. 12 is a flowchart of an example process 1200 implemented by mobile computing device 602 for distributing pictures 612. Initially, mobile computing device 602 retrieves 1202 from memory (e.g., memory device 606) a plurality of pictures (e.g., pictures 612) generated by a user (e.g., user 601) of mobile computing device 602. Additionally, mobile computing device 602 retrieves 1204 from the memory (e.g., memory device 606) account data (e.g., financial account data 608) used by a payment network (e.g., payment network 128) for transferring money to a financial account (e.g., cardholder account 132) associated with the user (e.g., user 601). Additionally, mobile computing device 602 receives 1206 from the user (e.g., user 601) a selection of one or more of the retrieved pictures (e.g., selected pictures 614) to be commercialized. Additionally, mobile computing device 602 receives 1208 a designation of a price (e.g., price data 908) that the user (e.g., user 601) is willing to commercialize the selected pictures (e.g., selected pictures 614) for. Additionally, mobile computing device 602 generates 1210 and stores a configuration file (e.g., configuration file 900) in the memory (e.g., memory device 606) that includes login credentials (e.g., login credentials 902) for a plurality of picture marketplace websites (e.g., picture marketplace websites 616), a tokenized version of the financial account data (e.g., tokenized financial account data 920), a location where the pictures (e.g., selected pictures 614) are stored in the memory (e.g., location of pictures 914), and the price (e.g., price data 908). Additionally, mobile computing device 602 generates 1212 metadata (e.g., metadata 710) including the tokenized version of the account data (e.g., tokenized financial account data 718) and the price (e.g., price 714) in association with each of the selected pictures (e.g., selected pictures 612). In some implementations, mobile computing device 602 also includes license terms (e.g., license terms 716) associated with each of the selected pictures in the metadata (e.g., metadata 710). Further, mobile computing device 602 transmits 1214 the selected pictures (e.g., selected pictures 612) and the associated metadata (e.g., metadata 710) to a plurality of picture marketplace websites (e.g., picture marketplace websites 616) for commercialization thereon.

In some implementations, after transmitting the selected pictures (e.g., selected pictures 612), mobile computing device 602 retrieves additional pictures (e.g., pictures 612) from the location (e.g., location 914) in memory (e.g., memory 606) and transmits the additional pictures (e.g., pictures 612) and the associated metadata (e.g., metadata 710) to the plurality of picture marketplace websites 616. In some implementations, mobile computing device 602 prompts the user (e.g., user 601) to agree to license terms (e.g., license terms 716). In some implementations, mobile computing device 602 receives login information (e.g., login credentials 902) from the user (e.g., user 601) for each picture marketplace website 616. In some implementations, mobile computing device 602 embeds the metadata (e.g., metadata 710) into each picture (e.g., first picture 702 and second picture 704). In some implementations, mobile computing device 602 stores the metadata (e.g., metadata 804) along with each selected picture (e.g., first picture 806 and second picture 808) in a package file (e.g., package file 802). In some implementations, mobile computing device 602 receives a designation (e.g., location 914) of a directory (e.g., directory 610) in the memory where the pictures are stored for transmission to the plurality of picture marketplace websites 616.

In some implementations, mobile computing device 602 stores, in the memory (e.g., memory 606), a listing (e.g., uploaded picture data 916) of the pictures 612 that have already been transmitted to the plurality of picture marketplace websites (e.g., plurality of picture marketplace websites 616), compares the listing of pictures (e.g., uploaded picture data 916) to a set of pictures 612 stored in the location (e.g., directory 610) in memory (e.g., memory 606), determines that at least one new picture 612 has been added to the location (e.g., directory 610) in the memory (e.g., memory 606), based on the comparison, and transmits the at least one new picture 612 to the plurality of picture marketplace websites 616.

In some implementations, payment processing server computing device 202 transmits an executed version of the license agreement (e.g., terms 716) to user 601 when a purchaser (e.g., first user 632) purchases a license to one of the pictures (e.g., first picture 702) through one of the picture marketplace websites (e.g., first picture marketplace website 618). In some implementations, mobile computing device 602 prompts the user to select license terms (e.g., license terms 716), receives a selection of the license terms (e.g., agreement to the license terms), and transmits the selected license terms (e.g., license terms 716) to at least one of the plurality picture marketplace websites (e.g., first picture marketplace website 618).

Figure 13:
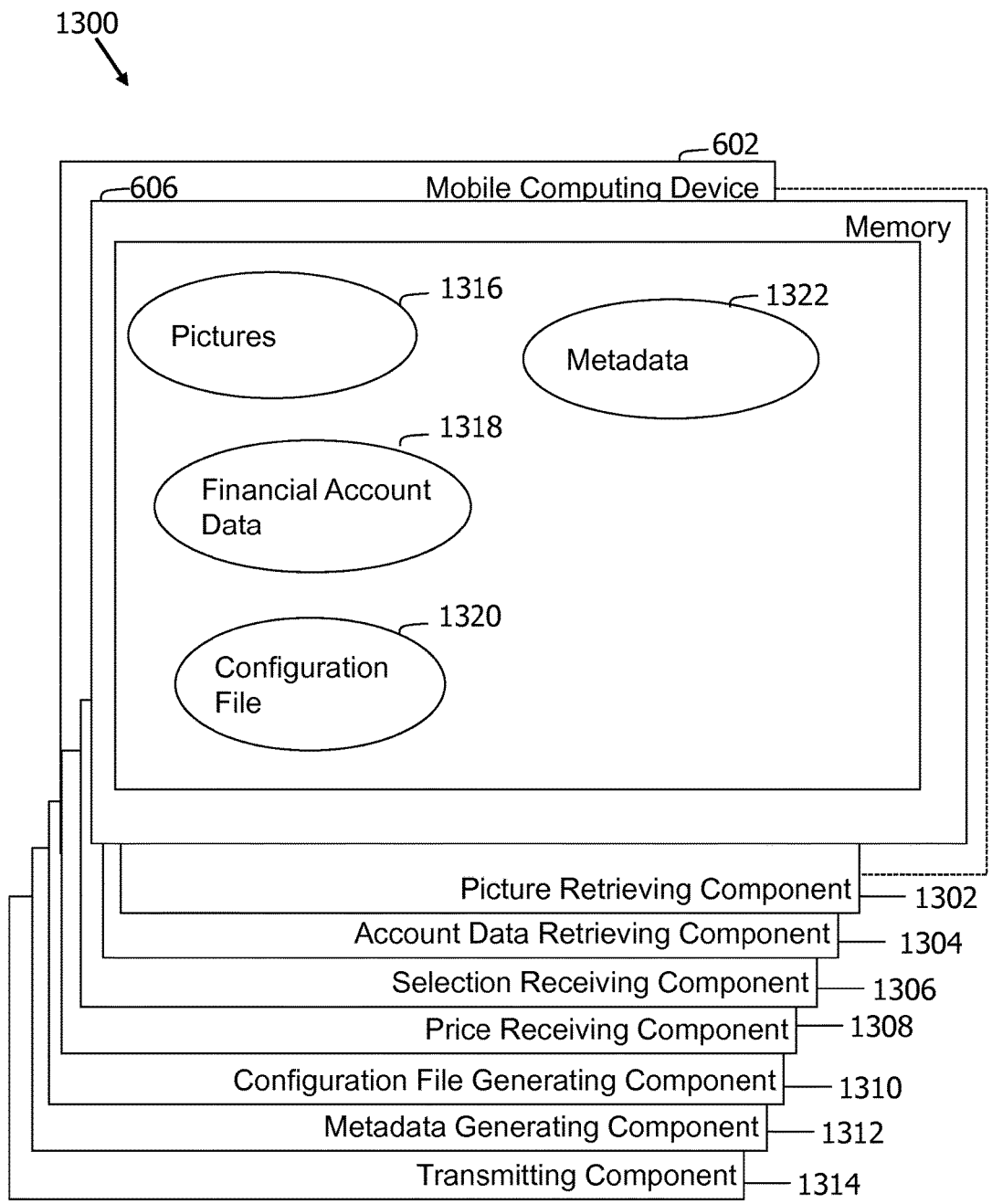

FIG. 13 is a diagram 1300 of components of one or more example computing devices, for example mobile computing device 602, that may be used in embodiments of the described systems and methods. FIG. 13 further shows a configuration of data in memory device 606. Memory device is in communication with several separate components within mobile computing device 602, which perform specific tasks.

Mobile computing device 602 includes a picture retrieving component 1302 for retrieving, from memory device 606, a plurality of pictures generated by a user of mobile computing device 602. Additionally, mobile computing device 602 includes an account data retrieving component 1304 for retrieving, from the memory device 606, account data used by a payment network for transferring money to a financial account associated with the user. Further, mobile computing device 602 includes a selection receiving component 1306 for receiving, from the user, a selection of one or more of the retrieved pictures to be commercialized. Mobile computing device 602 additionally includes a price receiving component 1308 for receiving a designation of a price that the user is willing to commercialize the selected pictures for. Mobile computing device 602 also includes configuration file generating component 1310 for generating and storing a configuration file in the memory device 606 that includes login credentials for a plurality of picture marketplace websites, a tokenized version of the account data, a location where the pictures are stored in the memory, and the price. Additionally, mobile computing device 602 includes a metadata generating component 1312 for generating metadata including the tokenized version of the account data, the price, and license terms in association with each of the selected pictures. Further, mobile computing device 602 includes a transmitting component 1314 for transmitting the selected pictures and the associated metadata to a plurality of picture marketplace websites for commercialization thereon.

In an example embodiment, data in memory device 606 is divided into a plurality of sections, including but not limited to, a pictures section 1316, a financial account data section 1318, a configuration file section 1320, and a metadata section 1322. These sections stored in memory device 606 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of a method and system for enabling distribution of digital pictures provide a user of a mobile computing device transmit digital pictures created by the user to multiple picture marketplace websites on an ongoing basis, without requiring the user to manually upload the pictures to each website, and enables viewers of the pictures on the various picture marketplace websites to purchase rights in the pictures using metadata encoded into the pictures. As a result, the methods and systems described herein enable people to more effectively and efficiently distribute and profit from their digital pictures.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A mobile computing device configured for modifying a structure of digital image files, said mobile computing device comprising a processor in communication with a memory, and a camera, said processor is configured to:
retrieve, from the memory, a plurality of digital image files created by a camera application on the mobile computing device, each of the plurality of digital image files including image data corresponding to an image captured by the camera and a header generated by the camera application;
retrieve, from the memory, account data used by a payment network for transferring money to a financial account associated with a user of the mobile computing device;
receive, from the user, a first selection of one or more of the retrieved digital image files;
store the one or more digital image files in the first selection in a predefined location in the memory;
receive a user designation of a purchase price for the digital image files in the predefined location;
receive a user designation of at least one license term for the digital image files in the predefined location;
generate and store a configuration file in the memory that includes login credentials of the user for each of a plurality of picture marketplace websites, a tokenized version of the account data, a path to the predefined location where the first selection of digital image files are stored in the memory, the purchase price, and the at least one license term, wherein the login credentials include a plurality of sets of login credentials, each set corresponding to one of the plurality of picture marketplace websites;
in response to a user submission instruction, generate a first plurality of modified digital image files, wherein each of the first plurality of modified digital image files includes the image data corresponding to one of the digital image files in the predefined location and a modified header, wherein the modified header includes the header of the corresponding digital image file and, from the configuration file, the tokenized version of the account data, the purchase price, and the at least one license term; and
without further input from the user:
access each of the plurality of picture marketplace websites using the corresponding one of the plurality of sets of login credentials stored in the configuration file and transmit the first plurality of modified digital image files to the plurality of picture marketplace websites;
after transmitting the first plurality of modified digital image files to the plurality of picture marketplace websites, update the configuration file to include a listing of digital image files that have been transmitted to the plurality of picture marketplace websites;
periodically identify current digital image files stored in the predefined location in the memory using the path stored in the configuration file;
compare the listing of digital image files that have been transmitted to the identified current digital image files to automatically identify a second selection of digital image files that have not been transmitted;
generate a second plurality of modified digital image files, wherein each of the second plurality of modified digital image files includes the image data corresponding to one of the second selection of digital image files and the modified header, wherein the modified header includes the header of the corresponding digital image file and, from the configuration file, the tokenized version of the account data, the purchase price, and the at least one license term; and
access each of the plurality of picture marketplace websites using the corresponding one of the plurality of sets of login credentials stored in the configuration file and transmit the second plurality of modified digital image files to the plurality of picture marketplace websites.

2. The mobile computing device of claim 1, further configured to, prior to receiving the user designation of the at least one license term, prompt the user to select the at least one license term.

3. The mobile computing device of claim 1, further configured to store the modified digital image files in a package file.

4. The mobile computing device of claim 1, further configured to receive a designation of a directory as the predefined location in the memory where the digital image files are stored for transmission to the plurality of picture marketplace websites.

5. A method for modifying a structure of digital image files, the method is implemented by a mobile computing device comprising a processor in communication with a memory, and a camera, said method comprising:

retrieving, from the memory, a plurality of digital image files created by a camera application on the mobile computing device, each of the plurality of digital image files including image data corresponding to an image captured by the camera and a header generated by the camera application;

retrieving, from the memory, account data used by a payment network for transferring money to a financial account associated with a user of the mobile computing device;

receiving, by the mobile computing device, from the user, a first selection of one or more of the retrieved digital image files;

store the one or more digital image files in the first selection in a predefined location in the memory;

receiving, by the mobile computing device, a user designation of a purchase price for the digital image files in the predefined location;

receiving a user designation of at least one license term for the digital image files in the predefined location;

generating and storing, by the mobile computing device, a configuration file in the memory that includes login credentials of the user for each of a plurality of picture marketplace websites, a tokenized version of the account data, a path to the predefined location where the first selection of digital image files are stored in the memory, the purchase price, and the at least one license term, wherein the login credentials include a plurality of sets of login credentials, each set corresponding to one of the plurality of picture marketplace websites;

in response to a user submission instruction, generating a first plurality of modified digital image files, wherein each of the first plurality of modified digital image files includes the image data corresponding to one of the digital image files in the predefined location and a modified header, wherein the modified header includes the header of the corresponding digital image file and, from the configuration file, the tokenized version of the account data, the purchase price, and the at least one license term; and without further input from the user:
  accessing each of the plurality of picture marketplace websites using the corresponding one of the plurality of sets of login credentials stored in the configuration file and transmitting the modified digital image files to the plurality of picture marketplace websites;
  after transmitting the first plurality of modified digital image files to the plurality of picture marketplace websites, updating the configuration file to include a listing of the digital image files that have been transmitted to the plurality of picture marketplace websites;
  periodically identifying current digital image files stored in the predefined location in the memory using the path stored in the configuration file;
  comparing the listing of digital image files that have been transmitted to the identified current digital image files to automatically identify a second selection of digital image files that have not been transmitted;
  generating a second plurality of modified digital image files, wherein each of the second plurality of modified digital image files includes the image data corresponding to one of the second selection of digital image files and the modified header, wherein the modified header includes the header of the corresponding digital image file and, from the configuration file, the tokenized version of the account data, the purchase price, and the at least one license term; and
  accessing each of the plurality of picture marketplace websites using the corresponding one of the plurality of sets of login credentials stored in the configuration file and transmitting the second plurality of modified digital image files to the plurality of picture marketplace websites.

6. The method of claim 5, further comprising prior to receiving by the mobile computing device, the user designation of the at least one license term, prompting the user to select the at least one license term.

7. The method of claim 5, further comprising storing, by the mobile computing device, the modified digital image files in a package file.

8. The method of claim 5, further comprising receiving, by the mobile computing device, a designation of a directory as the predefined location in the memory where the digital image files are stored for transmission to the plurality of picture marketplace websites.

9. A non-transitory computer-readable storage medium having computer-executable instructions embodied thereon, wherein when executed by a mobile computing device comprising at least one processor coupled to a memory, and a camera, the computer-executable instructions cause the mobile computing device to:

retrieve, from the memory, a plurality of digital image files created by a camera application on the mobile computing device, each of the plurality of digital image files including image data corresponding to an image captured by the camera and a header generated by the camera application;

retrieve, from the memory, account data used by a payment network for transferring money to a financial account associated with a user of the mobile computing device;

receive, from the user, a first selection of one or more of the retrieved digital image files;

store the one or more digital image files in the first selection in a predefined location in the memory;

receive a designation of a purchase price for the digital image files in the predefined location;

receive a user designation of at least one license term for the digital image files in the predefined location;

generate and store a configuration file in the memory that includes login credentials of the user for each of a plurality of picture marketplace websites, a tokenized version of the account data, a path to the predefined location where the first selection of digital image files are stored in the memory, the purchase price, and the at least one license term, wherein the login credentials include a plurality of sets of login credentials, each set corresponding to one of the plurality of picture marketplace websites;

in response to a user submission instruction, generate a first plurality of modified digital image files, wherein each of the first plurality of modified digital image files includes the image data corresponding to one of the digital image files in the predefined location and a modified header, wherein the modified header includes the header of the corresponding digital image file and, from the configuration file, the tokenized version of the account data, the purchase price, and the at least one license term; and without further input from the user:
- access each of the plurality of picture marketplace websites using the corresponding one of the plurality of sets of login credentials stored in the configuration file and transmit the first plurality of modified digital image files to the plurality of picture marketplace websites;
- after transmitting the first plurality of modified digital image files to the plurality of picture marketplace websites, update the configuration file to include a listing of the digital image files that have been transmitted to the plurality of picture marketplace websites;
- periodically identify current digital image files stored in the predefined location in the memory using the path stored in the configuration file;
- compare the listing of digital image files that have been transmitted to the identified current digital image files to automatically identify a second selection of digital image files that have not been transmitted;
- generate a second plurality of modified digital image files, wherein each of the second plurality of modified digital image files includes the image data corresponding to one of the second selection of digital image files and the modified header, wherein the modified header includes the header of the corresponding digital image file and, from the configuration file, the tokenized version of the account data, the purchase price, and the at least one license term; and
- access each of the plurality of picture marketplace websites using the corresponding one of the plurality of sets of login credentials stored in the configuration file and transmit the second plurality of modified digital image files to the plurality of picture marketplace websites.

10. The computer-readable storage medium of claim 9, wherein prior to receiving the user designation of the at least one license term, said computer-readable instructions additionally cause the mobile computing device to prompt the user to select the at least one license term.

11. The mobile computing device of claim 1, wherein data from the modified header is configured to be extracted by each of the plurality of picture marketplace websites, and wherein the tokenized version of the account data is electronically transmitted by at least one of the plurality of picture marketplace websites to a payment network server when a purchaser of a selected modified digital image file selects the selected modified digital image file displayed on the at least one of the plurality of picture marketplace website.

12. The mobile computing device of claim 1, wherein the plurality of modified digital image files are stored in a remote database server separate from the mobile computing device.

13. The mobile computing device of claim 1, further configured to store, in the memory, a plurality of purchase prices received from the user, wherein the plurality of purchase prices includes a default purchase price for the selected digital image files and at least one specific purchase price for a corresponding digital image file, wherein the at least one specific purchase price is different from the default purchase price.

* * * * *